July 20, 1943.  H. R. DICKINSON ET AL  2,324,914
PROCESS OF DESICCATING FOODS
Original Filed July 25, 1935

Inventor
HENRY RANDEL DICKINSON
HENRY H. MORETON

By  Wm S. Hodges  Attorney

Patented July 20, 1943

2,324,914

UNITED STATES PATENT OFFICE 2,324,914

PROCESS OF DESICCATING FOODS

Henry Randel Dickinson, Grand Rapids, Mich., and Henry H. Moreton, East Orange, N. J.

Substituted for abandoned application Serial No. 33,151, July 25, 1935. This application July 1, 1941, Serial No. 400,652

6 Claims. (Cl. 99—199)

This invention is a process for dehydrating milk, eggs, and other fluid or semi-fluid food products, and also includes the product of said process.

One of the objects of the invention is to produce a desiccated food product which retains all of the vitamin content inherent to the treated food in its natural state. In the desiccation of foods as commonly practiced, the materials are usually dried by the use of steam or heated air. Owing to the presence of oxygen, the vitamin content is oxidized and destroyed. A further object of the invention is to avoid this vitamin destruction by effecting dehydration through the medium of a hot oxygen-free gas, as a means of supplying the necessary temperature and moisture carrying medium for dehydration.

The invention will be hereinafter fully set forth and particularly pointed out in the claims.

Figure 1:
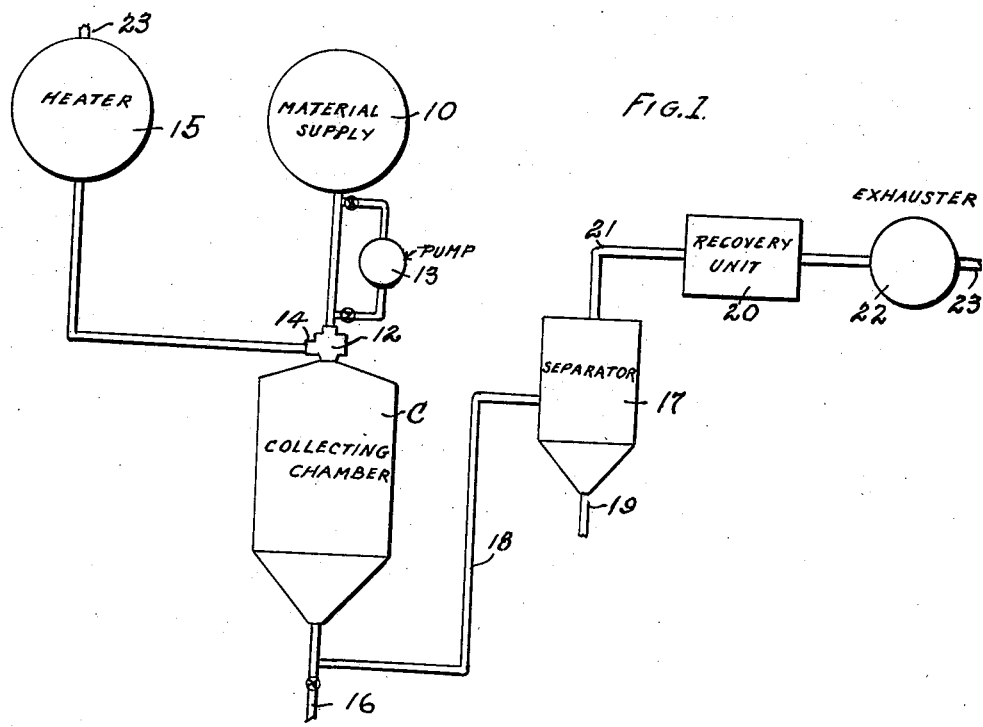
Figure 2:
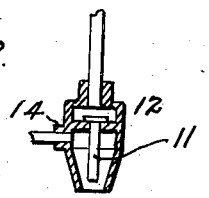

In the accompanying drawing:

Figure 1 is a diagrammatic view illustrating one form of apparatus for the practice of the invention. Figure 2 is a detail sectional view illustrating a type of atomizing nozzle employed in said apparatus.

Referring to the drawing, 10 designates a supply tank for the material to be desiccated, said tank communicating with the inner branch 11, of a nozzle 12, so as to feed by gravity thereto, but provided with a pump 13 for increasing the pressure, if desired. Communicating with the outer branch 14, of the nozzle 12, is a heater 15 for supplying $CO_2$ gas to the nozzle at sufficient pressure to atomize the material supplied to the nozzle from tank 10. Any other oxygen-free gas which will be chemically inert with respect to the material being treated may be substituted for the $CO_2$ gas.

The nozzle 12 discharges the mixed material and gas into a collecting chamber C, which is of sufficient volume to provide a substantial reduction of pressure adjacent the nozzle, thereby atomizing the food materials and causing them to give up their moisture to the hot $CO_2$ gas, as the mixture is discharged into the chambers. If desired, the contents of the chamber C may be drawn off through the pipe 16, or they may be delivered to any standard type cyclone separator, indicated at 17, through the pipe 18. After separation, the dried product is removed through the outlet 19, and the $CO_2$ gas leaves at the top of the collector, and passes to a suitable recovery unit 20, through conduit 21. The recovered gas is exhausted from the unit by suitable means indicated at 22, and may be returned to the heater 15 through pipe 23, or sent elsewhere for any desired disposition.

In operation, the function of the nozzle 12 is to transfer the heat contained in the inert gas to the liquid to be dried. The operation is practically instantaneous, the temperature of the food material being treated being maintained below the critical temperature of vitamin destruction, and low enough to prevent coagulation of the albumen, unless the last mentioned result is desired. Complete pasteurization is possible by means of the above process without the destruction of any essential food values, and it is obvious that the vitamins are protected against destruction because they do not at any time come into contact with oxygen, so that oxidization is impossible, due to the fact that all of the steps are carried out in a closed system. It will also be understood that due to the use of an inert gas, there is no contamination of the food material, and that the final product does not contain any constituents which are not inherent to the original material.

This case is a substitute for application filed July 25, 1935, Serial Number 33,151.

Having thus explained the nature of the invention and described an operative manner of constructing and using the same, although without attempting to set forth all of the forms in which it may be made, or all of the forms of its use, what is claimed is:

1. The process of desiccating foods comprising causing a stream of hot oxygen-free gas and a separate stream of food material to commingle and to be discharged into a closed space, and maintaining sufficient pressure upon said gas to atomize the food material as it is so discharged and in such manner that the heat of the gas drives off the moisture carried by the food material without vitamin destruction.

2. The process of desiccating foods comprising causing a stream of hot oxygen-free gas and a separate stream of food material to commingle and to be discharged into a closed space, maintaining the temperature of said gas below the critical temperature of vitamin destruction, and maintaining sufficient pressure upon said gas to atomize the food material as it is so discharged and in such manner that the heat of the gas drives off the moisture carried by the food material without vitamin destruction.

3. The process of desiccating foods comprising causing a stream of heated $CO_2$ gas to commingle with a stream of food material and to be discharged into a closed space, maintaining said gas at a temperature below the critical temperature of vitamin destruction, and maintaining sufficient pressure upon said gas to cause the latter to atomize the food material as it is so discharged and in such manner that the food materials give up their moisture to the hot $CO_2$ gas without oxidation of the vitamins.

4. The process of desiccating foods comprising inducing a stream of food material to be discharged into a closed space by the action of a flowing stream of heated oxygen-free gas travelling under pressure to said closed space, maintaining a sufficient pressure upon said gas to cause it to atomize the food stream as it is so discharged and in such manner that the hot gas will drive off the moisture carried by the food material without vitamin destruction.

5. The process of desiccating foods comprising creating a flowing stream of heated non-oxidizable gas and causing it to flow to a closed space, causing said stream of hot gas to induce the flow of a stream of food material to said closed space, maintaining a pressure upon said stream of hot gas sufficient to cause said gas to atomize the food material as it is so discharged and in such manner that the food material will give up its moisture to the hot gas without vitamin destruction.

6. The process of desiccating foods comprising inducing a stream of food material to travel to a closed space by the eductive effect of a flowing stream of heated $CO_2$ gas maintained at a temperature below the critical temperature of vitamin destruction, and maintaining sufficient pressure upon said gas to cause it to atomize the food material as it is so discharged and in such manner that the hot gas will drive off the moisture carried by said food material without vitamin destruction.

HENRY RANDEL DICKINSON.
HENRY H. MORETON.